United States Patent
Shiozaki et al.

(10) Patent No.: US 10,535,879 B2
(45) Date of Patent: *Jan. 14, 2020

(54) POSITIVE ELECTRODE FOR NON-AQUEOUS ELECTROLYTE SECONDARY BATTERY AND NON-AQUEOUS ELECTROLYTE SECONDARY BATTERY

(71) Applicant: SANYO Electric Co., Ltd., Daito-shi, Osaka (JP)

(72) Inventors: Tomoki Shiozaki, Osaka (JP); Yasunari Sugita, Osaka (JP); Kazuki Endo, Osaka (JP)

(73) Assignee: SANYO Electric Co., Ltd., Daito-shi (JP)

( * ) Notice: Subject to any disclaimer, the term of this patent is extended or adjusted under 35 U.S.C. 154(b) by 104 days.

This patent is subject to a terminal disclaimer.

(21) Appl. No.: 15/782,463

(22) Filed: Oct. 12, 2017

(65) Prior Publication Data

US 2018/0047991 A1 Feb. 15, 2018

Related U.S. Application Data

(62) Division of application No. 14/423,944, filed as application No. PCT/JP2014/000483 on Jan. 30, 2014, now Pat. No. 9,819,026.

(30) Foreign Application Priority Data

Jan. 31, 2013 (JP) .................... 2013-017487

(51) Int. Cl.
*H01M 10/0525* (2010.01)
*H01M 4/04* (2006.01)
*H01M 4/62* (2006.01)
*H01M 4/131* (2010.01)

(52) U.S. Cl.
CPC .......... *H01M 4/628* (2013.01); *H01M 4/0404* (2013.01); *H01M 4/131* (2013.01); *H01M 10/0525* (2013.01)

(58) Field of Classification Search
CPC .. H01M 4/628; H01M 10/0525; H01M 4/131; H01M 4/0404
See application file for complete search history.

(56) References Cited

U.S. PATENT DOCUMENTS

| | | |
|---|---|---|
| 2007/0148555 A1 | 6/2007 | Fukaya et al. |
| 2009/0258182 A1 | 10/2009 | Okamoto et al. |
| 2010/0063249 A1 | 3/2010 | Kawada et al. |
| 2011/0212361 A1 | 9/2011 | Kim et al. |
| 2011/0269880 A1 | 11/2011 | Pfaendner et al. |
| 2011/0319534 A1 | 12/2011 | Ding et al. |
| 2012/0077401 A1 | 3/2012 | Kotake et al. |
| 2013/0216899 A1 | 8/2013 | Tsujikawa et al. |

FOREIGN PATENT DOCUMENTS

| | | |
|---|---|---|
| CN | 101106185 A | 1/2008 |
| CN | 102202883 A | 9/2011 |
| JP | 11-302004 A | 11/1999 |
| JP | 3131905 B2 | 2/2001 |
| JP | 2009-016106 A | 1/2009 |
| JP | 2010-251217 A | 11/2010 |
| JP | 2012-079685 A | 4/2012 |
| JP | 2012-253060 A | 12/2012 |
| WO | 2008053864 A1 | 5/2008 |
| WO | 2012/133584 A1 | 10/2012 |

OTHER PUBLICATIONS

International Search Report dated Mar. 25, 2014, issued in corresponding application No. PCT/JP2014/000483.
Second and Supplementary Notice Informing the Applicant of the Communication of the International Application (Form PCT/IB/308) issued in counterpart International Application No. PCT/JP2014/00483 dated Jun. 4, 2015, with Forms PCT/IB/326, PCT/IB/373, PCT/ISA/237 and PCT/IB/338 (13 pages).
Office Action and Search Report dated Apr. 14, 2016, issued in counterpart Chinese Patent Application No. 201480002246.0, with English translation. (15 pages).
Office Action dated Oct. 25, 2016., issued in counterpart Japanese Application No. 2014-559586 (2 pages).

*Primary Examiner* — Muhammad S Siddiquee
(74) *Attorney, Agent, or Firm* — Westerman, Hattori, Daniels & Adrian, LLP

(57) ABSTRACT

A positive electrode for a non-aqueous electrolyte secondary battery, comprising: a positive electrode current collector and a positive electrode active substance layer formed upon the positive electrode current collector. The positive electrode active substance layer has a positive electrode active substance and a melamine-acid salt being a salt comprising melamine and acid.

5 Claims, 3 Drawing Sheets

POSITIVE ELECTRODE FOR NON-AQUEOUS ELECTROLYTE SECONDARY BATTERY AND NON-AQUEOUS ELECTROLYTE SECONDARY BATTERY

CROSS-REFERENCE TO RELATED APPLICATIONS

This application is a Continuation of U.S. patent application Ser. No. 14/423,944, filed on Feb. 25, 2015, which is a national stage application filed under 35 USC 371 of International Application No. PCT/JP2014/000483, filed Jan. 30, 2014, and which is based upon and claims the benefit of Priority from the prior Japanese Patent Application No. 2013-017487, filed on Jan. 31, 2013, the entire contents of which are incorporated herein by reference.

TECHNICAL FIELD

The present invention relates to a positive electrode for a non-aqueous electrolyte secondary battery and a non-aqueous electrolyte secondary battery using the same.

BACKGROUND ART

In a non-aqueous electrolyte secondary battery, use of a phosphorus-containing compound has been known, for suppressing an exothermic reaction between the positive electrode active material and the non-aqueous electrolytic solution. Patent Document 1 discloses suppressing the exothermic reaction between the positive electrode active material and the non-aqueous electrolytic solution by dissolving a phosphate ester at 15% or more by mass based on the total amount of the non-aqueous electrolytic solution. In addition, in Patent Document 2, it is disclosed that the exothermic reaction between the positive electrode active material and the non-aqueous electrolytic solution is suppressed by adding polyphosphoric acid, a phosphazene derivative, or the like in the positive electrode mixture at 6% or more by mass.

CITATION LIST

Patent Literature

Patent Document 1: Japanese Patent No. 3131905
Patent Document 2: Japanese Patent Laid-Open Publication No. 2010-251217

SUMMARY OF INVENTION

Technical Problem

However, dissolving a large amount of the phosphate ester in the non-aqueous electrolytic solution results in reduction of ion conductivity of the non-aqueous electrolytic solution, and a side reaction between the phosphate ester and the negative electrode, thereby deteriorating the input-output characteristics, the charge-discharge efficiency, and the like. In addition, the input-output characteristics and the charge-discharge efficiency are deteriorated by adding a large amount of polyphosphoric acid or the like in the positive electrode mixture.

It is an object of the present invention to provide a positive electrode for a non-aqueous electrolyte secondary battery that is excellent in safety, input-output characteristics, and charge-discharge efficiency, as well as a non-aqueous electrolyte secondary battery using the same.

Solution to Problem

A positive electrode for a non-aqueous electrolyte secondary battery according to the present invention comprises a positive electrode current collector, and a positive electrode active material layer formed on the positive electrode current collector, and the positive electrode active material layer has a positive electrode active material and a melamine-acid salt being a salt comprising melamine and acid.

In addition, a non-aqueous electrolyte secondary battery according to the present invention comprises a positive electrode, a negative electrode, and a non-aqueous electrolyte, and the positive electrode comprises a positive electrode current collector and a positive electrode active material layer formed on the positive electrode current collector, and the positive electrode active material layer has a positive electrode active material and a melamine-acid salt being a salt comprising melamine and acid.

Advantageous Effects of Invention

The positive electrode for a non-aqueous electrolyte secondary battery according to the present invention and the non-aqueous electrolyte secondary battery using the same are excellent in safety, energy density, and input-output characteristics.

DESCRIPTION OF EMBODIMENT

Hereinafter, an embodiment according to the present invention will be described in detail. A non-aqueous electrolyte secondary battery according to the embodiment of the present invention, for example, has a constitution in which an electrode body and a non-aqueous electrolyte are contained in an armoring body, the electrode body being formed of a positive electrode and a negative electrode wound with a separator interposed therebetween, or alternatively positive electrodes and negative electrodes alternately stacked with separators interposed therebetween. Each component of the non-aqueous electrolyte secondary battery will be described in detail below.

[Positive Electrode]

Figure 1:
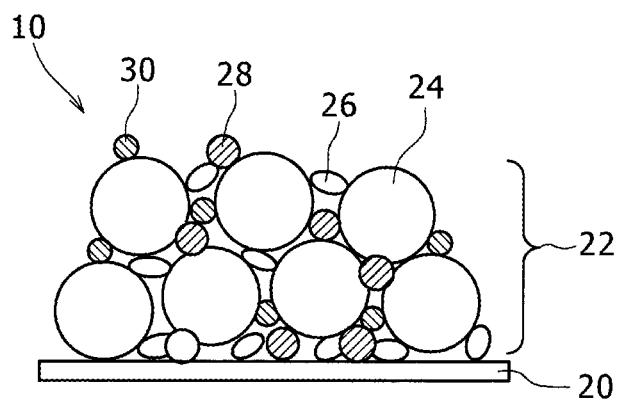
FIG. 1 is a partial sectional view of an example of a positive electrode for a non-aqueous electrolyte secondary battery according to an embodiment of the present invention.

FIG. 1 is a partially sectional view of a positive electrode 10. The positive electrode 10 is constituted of a positive electrode current collector 20 which is metal foil or the like and a positive electrode active material layer 22 formed on the positive electrode current collector 20. For the positive electrode current collector 20, there is used a foil of a metal which is stable within the potential range of the positive electrode, a film on which a metal which is stable within the potential range of the positive electrode is disposed as a surface layer, or the like. Suitably, aluminum (Al) is used as the metal stable within the potential range of the positive electrode. The positive electrode active material layer 22 is a layer which contains an electrically conductive material 26, a binder 28, a melamine-acid salt 30, and the like in addition to a positive electrode active material 24, and is obtained by mixing these materials in a suitable solvent, applying the resultant mixture to the positive electrode current collector 20, drying the applied material, and then rolling the dried material.

For the positive electrode active material 24, there may be used a transition metal oxide containing an alkali metal element in a particulate shape, or a transition metal oxide in which a portion of the transition metal element contained in the above-described transition metal oxide has been substituted with a different kind of element. Examples of the alkali metal element include lithium (Li) and sodium (Na). Among these alkali metal elements, lithium is preferably used. For the transition metal element, there may be used at least one transition metal element selected from the group consisting of scandium (Sc), manganese (Mn), iron (Fe), cobalt (Co), nickel (Ni), copper (Cu), yttrium (Y), and the like. Among these transition metal elements, Mn, Co, Ni, or the like is preferably used. For the different kind of element, there may be used at least one different kind of element selected from the group consisting of magnesium (Mg), aluminum (Al), lead (Pb), antimony (Sb), boron (B), and the like. Among these different kinds of elements, Mg, Al, or the like is preferably used.

Specific examples of such the positive electrode active material 24 include $LiCoO_2$, $LiNiO_2$, $LiMn_2O_4$, $LiMnO_2$, $LiNi_{1-y}Co_yO_2$, $(0<y<1)$, $LiNi_{1-y-z}Co_yMn_zO_2$, $(0<y+z<1)$, and $LiFePO_4$ as the lithium-containing transition metal oxides in which lithium is used as the alkali metal element. For the positive electrode active material 24, these materials may be used singly or in combinations of two or more thereof.

The electrically conductive material 26 is a powder, a particle, or the like having electrical conductivity and is used in order to enhance the electron conductivity of the positive electrode active material layer 22. For the electrically conductive material 26, there is used a carbon material, a metal powder, an organic material, or the like having electrical conductivity. Specifically, examples of the electrically conductive material 26 include acetylene black, Ketjen black, graphite, and the like as the carbon material; aluminum and the like as the metal powder; potassium titanate, titanium oxide, and the like as metal oxides; and phenylene derivatives, and the like as the organic materials. These electrically conductive materials 26 may be used singly or in combinations of two or more thereof.

The binder 28 is a polymer having a particulate shape or a network structure and is used in order to maintain a good contacting state between the positive electrode active material 24 in a particulate shape and the electrically conductive material 26 in a powdery or particulate shape and to enhance bindability of the positive electrode active material 24 and the like to the surface of the positive electrode current collector 20. For the binder 28, there may be used a fluorine-containing polymer, an elastomeric polymer, or the like. Specifically, examples of the binder 28 include polytetrafluoroethylene (PTFE), polyvinylidene fluoride (PVdF), modified materials thereof, or the like as fluorine-containing polymers; and ethylene-propylene-isoprene copolymer, ethylene-propylene-butadiene copolymer, and the like as elastomeric polymers. The binder 28 may be used together with a thickener such as carboxymethyl cellulose (CMC), polyethylene oxide (PEO), or the like.

The melamine-acid salt 30 is a powder having flame retardance and, in the copresence of the flammable non-aqueous electrolytic solution, has a function as a flame retardant agent serving as a reaction inhibitor to delay the exothermic reaction of the non-aqueous electrolytic solution, thereby suppressing the calorific value. The melamine-acid salt 30 is a compound synthesized from melamine and an acid exhibiting strong flame retardance and is preferably at least one selected from melamine polyphosphate, melamine sulfate, melamine cyanurate, melamine borate, and melamine pyrophosphate. Further, the melamine-acid salt 30 is preferably melamine sulfate represented by the following chemical formula (1) or melamine polyphosphate represented by the following chemical formula (2).

[Formula 1]

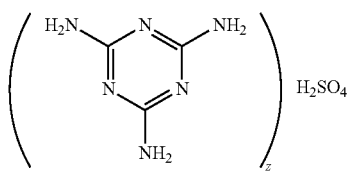

Formula (1)

[Formula 2]

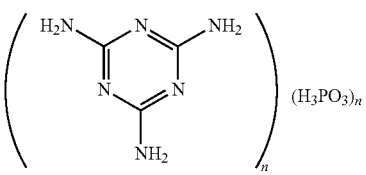

Formula (2)

It is noted that oxygen generated from the positive electrode active material 24 during charging is considered to oxidize the non-aqueous electrolytic solution and this oxidation reaction is an exothermic reaction accompanied by heat generation, thereby raising the temperature inside the battery. Accordingly, it is effective to place the flame retardant agent in the vicinity of the positive electrode active material 24 in order to suppress the exothermic reaction between the positive electrode active material 24 and the non-aqueous electrolytic solution, taking the generation of the oxygen from the positive electrode active material 24 into consideration.

Accordingly, the present inventors have conceived of placing the melamine-acid salt 30 composed of melamine and an acid exhibiting strong flame retardance within the positive electrode 10, thereby suppressing the exothermic reaction between oxygen and the non-aqueous electrolytic solution.

As described above, the melamine-acid salt 30 is preferably sparingly soluble in the non-aqueous electrolytic solution so as to remain within the positive electrode active material layer 22. Solubility of the aromatic phosphate ester compound 30 in the non-aqueous electrolytic solution was employed as the index for being sparingly soluble.

[Determination of Solubility]

Determination of the solubility was performed as follows. Ethylene carbonate (EC), ethyl methyl carbonate (EMC), and dimethyl carbonate (DMC) were mixed together at a volume ratio of 3:3:4 to prepare a non-aqueous solvent. In this determination, this mixed solvent was used as the non-aqueous electrolytic solution. Ten grams of the non-aqueous electrolytic solution was weighed, 1 g of a melamine-acid salt 30 was added thereto, and the mixture was thoroughly stirred at 25° C. Then, the non-aqueous electrolytic solution was removed by filtration and the weight of the non-dissolved fraction was measured to determine the dissolved amount of the melamine-acid salt 30 in the non-aqueous electrolytic solution. The solubility (%) of the melamine-acid salt 30 in the non-aqueous electrolytic solution was calculated by dividing the dissolved amount of the melamine-acid salt 30 (g) by the weight (g) of the non-aqueous electrolytic solution and multiplying the resultant quotient by 100.

The solubility of the melamine-acid salt 30 in the non-aqueous electrolytic solution is preferably 0.5% or less. There is no particular lower limit, and the solubility of 0%; i.e., being insoluble, is more preferable.

Since the melamine-acid salt 30 can remain and be scattered within the positive electrode active material layer 22 as described above, the particle diameter of the melamine-acid salt 30 is preferably smaller than that of the positive electrode active material 24. In addition, the adding quantity of the melamine-acid salt 30 may be less than that in the case of using a flame retardant agent soluble in the non-aqueous electrolytic solution.

In addition, the melamine-acid salt 30 exerts an excellent flame retardant effect in a smaller amount even compared to the flame retardant agent conventionally added within the positive electrode 10. Accordingly, the optimal adding quantity thereof can be calculated based on the volume energy density in the battery characteristics, and is preferably 1% or more by mass and 3% or less by mass based on the total amount of the positive electrode active material layer 22. In addition, the adding quantity thereof is more preferably 1% by mass based on the total amount of the positive electrode active material layer 22.

[Negative Electrode]

For the negative electrode, any material which has been conventionally used for the negative electrode in the non-aqueous electrolyte secondary battery may be used without particular limitation. Such the negative electrode may be obtained by, for example, mixing a negative electrode active material and a binder in water or a suitable solvent, applying the resultant mixture to a negative electrode current collector, drying the applied material, and rolling the dried material.

For the negative electrode active material, any material capable of occluding and releasing alkali metal ions may be used without particular limitation. For such a negative electrode active material, there may be used, for example, carbon materials, metals, alloys, metal oxides, metal nitrides, and carbon and silicon pre-occluding alkali metal. The carbon materials include natural graphite, artificial graphite, pitch-based carbon fiber, and the like. Specific examples of the metals or alloys include lithium (Li), silicon (Si), tin (Sn), germanium (Ge), indium (In), gallium (Ga), lithium alloys, silicon alloys, and tin alloys. For the negative electrode active material, these materials may be used singly or in combination of two or more thereof.

For the binder, a fluorine-containing polymer, an elastomeric polymer, or the like may be used similar to the case of the positive electrode 10, but there is preferably used styrene-butadiene copolymer (SBR), being an elastomeric polymer, a modified material thereof, or the like. The binder may be used together with a thickener such as carboxymethyl cellulose (CMC).

For the negative electrode current collector, there is used a foil of a metal which does not form an alloy with lithium within the potential range of the negative electrode, or a film disposed with a metal which does not form an alloy with lithium within the potential range of the negative electrode as a surface layer, or the like. For the metal which does not form an alloy with lithium within the potential range of the negative electrode, it is suitable to use copper, which is low in cost, easily processed, and good in electron conductivity.

[Non-Aqueous Electrolyte]

The non-aqueous electrolyte contains a non-aqueous solvent, and an electrolyte salt dissolved in the non-aqueous solvent. The non-aqueous electrolyte is not limited to a non-aqueous electrolytic solution, being a liquid electrolyte, but may be a solid electrolyte.

For the non-aqueous solvent, there may be used cyclic carbonates, open-chain carbonates, nitriles, amides, and the like. For the cyclic carbonates, there may be used cyclic carbonates, cyclic carboxylic acid esters, cyclic ethers, and the like. For the open-chain carbonates, there may be used open-chain esters, open-chain ethers, and the like. More specifically, there may be used ethylene carbonate (EC) and the like for the cyclic carbonates, γ-butylolactone (γ-GBL) and the like for the cyclic carboxylic acid esters, and ethylmethyl carbonate (EMC), dimethyl carbonate (DMC), and the like for the open-chain esters. In addition, there may be used halogen-substituted substances which are formed by substituting a hydrogen atom of these respective non-aqueous solvents with a halogen atom such as a fluorine atom. Among others, it is preferred to mix EC as a cyclic carbonate which is a solvent with a high dielectric constant and EMC and DMC as open-chain carbonates which are solvents with a low viscosity, and use the mixture.

For the electrolyte salt, alkali metal salts may be used and lithium salts are more preferable. For the lithium salts, there may be used $LiPF_6$, $LiBF_4$, $LiClO_4$, and the like which have been generally used as the supporting electrolyte in conventional non-aqueous electrolyte secondary batteries. These lithium salts may be used singly or in combination of two or more thereof.

In addition, the non-aqueous electrolyte may contain an additive used for the purpose of forming a good coating on the positive electrode or the negative electrode or the like. For the additive, there may be used vinylene carbonate (VC), ethylene sulfite (ES), cyclohexylbenzene (CHB), modified substances thereof, and the like. These additives may be used singly or in combination of two or more thereof. The fraction of the non-aqueous electrolyte for the additive accounts is not particularly limited, but is suitably approximately 0.05 to 10% by mass based on the total amount of the non-aqueous electrolyte.

[Separator]

For the separator, there is used a porous film having ion permeability and insulating properties disposed between the positive electrode and the negative electrode. The porous film may include microporous thin films, woven fabric, non-woven fabric, and the like. The material used for the separator is preferably a polyolefin, more specifically polyethylene, polypropylene, or the like.

EXAMPLES

Hereinafter, the present invention will be more specifically illustrated in detail, referring to Example and Comparative Examples, but the present invention is not intended to be limited to Example below. In the following examples, non-aqueous electrolyte secondary batteries used in Example 1 and Comparative Examples 1 to 3 were manufactured in order to evaluate the effects of the flame retardant agents. The specific procedures for manufacturing the non-aqueous electrolyte secondary batteries are as follows.

Example 1

[Preparation of Positive Electrode]

A lithium-containing transition metal oxide represented by the general formula $LiNi_{0.5}Co_{0.2}Mn_{0.3}O_2$ was used for a positive electrode active material. A positive electrode was prepared as follows. First, the positive electrode active material 24 represented by $LiNi_{0.5}Co_{0.2}Mn_{0.3}O_2$, acetylene black serving as the electrically conductive material 26, and polyvinylydene fluoride powder serving as the binder 28 were mixed together so that the respective contents were 92% by mass, 5% by mass, and 3% by mass, to give a mixture. The melamine sulfate serving as a melamine-acid salt of a flame retardant agent was mixed with the mixture at 1% by mass based on the mixture, and the resultant mixture was further mixed with an N-methyl-2-pyrrolidone (NMP) solution to a prepare slurry. This slurry was applied to both surfaces of the positive electrode current collector 20 made of aluminum having a thickness of 15 μm by the doctor blade method to form the positive electrode active material layers 22. Then, the layers were compressed using a compression roller to prepare a positive electrode.

[Preparation of Negative Electrode]

For the negative electrode active material, three kinds of materials: natural graphite, artificial graphite, and artificial graphite surface-coated with amorphous carbon, were prepared, and a blend thereof was used. The negative electrode was prepared as follows. First, the negative electrode active material, styrene-butadiene copolymer (SBR) serving as a binder, and carboxymethyl cellulose (CMC) serving as a thickener were mixed together so that the respective contents were 98% by mass, 1% by mass, and 1% by mass to give a mixture, the mixture was mixed with water to prepare a slurry, and then this slurry was applied to both surfaces of a negative electrode current collector made of copper having a thickness of 10 μm by the doctor blade method to form negative electrode active material layers. Then, the layers were compressed using a compression roller to a predetermined density to prepare a negative electrode.

[Preparation of Non-Aqueous Electrolyte]

$LiPF_6$ was dissolved as the electrolyte salt at a concentration of 1.0 mol/L in a non-aqueous solvent which had been prepared by mixing ethylene carbonate (EC), ethylmethyl carbonate (EMC), and dimethyl carbonate (DMC) at a volume ratio of 3:3:4 to prepare a non-aqueous electrolytic solution which was a liquid non-aqueous electrolyte, and the solution was used to manufacture the battery.

[Manufacture of Cylindrical Non-Aqueous Electrolyte Secondary Battery]

Further, the positive electrode, the negative electrode, and the non-aqueous electrolytic solution thus prepared were used to manufacture a cylindrical non-aqueous electrolyte secondary battery (hereinafter, referred to as a cylindrical battery) by the following procedures. That is, the positive electrode 10 prepared as described above was shaped in a size of short sides of 55 mm and long sides of 600 mm, the negative electrode was shaped in a size of short sides of 57 mm and long sides of 620 mm, and then the positive electrode 10 and the negative electrode were wound with a separator interposed therebetween to prepare a wound electrode body. Subsequently, the wound electrode body was disposed with insulation plates on the top and bottom, and was accommodated in a cylindrical battery outer can made of steel having a diameter of 18 mm and a height of 65 mm, with the wound electrode body also serving as a negative electrode terminal. Then, the collector tab of the negative electrode was welded to the inner bottom part of the battery outer can and the collector tab of the positive electrode 10 was welded to the bottom plate part of the current interruption sealing body incorporated with a safety device. The non-aqueous electrolytic solution was supplied from the opening of the battery outer can, and then the battery outer can was sealed with the current interruption sealing body provided with a safety valve and a current interruption device to give a cylindrical battery. It is noted that in the cylindrical battery setup was done so as to attain negative electrode capacity/positive electrode capacity=1.1.

[Manufacture of Coin-Type Non-Aqueous Electrolyte Secondary Battery]

The positive electrode and the non-aqueous electrolytic solution prepared as described above were used to manufacture a coin-type non-aqueous electrolyte secondary battery (hereinafter, referred to as a coin-type battery) by the following procedures. However, the positive electrode was that formed by applying the slurry on a single surface of the positive electrode current collector, and lithium foil was used for the negative electrode. The positive electrode 10 prepared as described above was punched into a round shape having a diameter of 17 mm, and the negative electrode was punched into a round shape having a diameter of 19 mm. Subsequently, the negative electrode was crimped to the inside of the bottom part of a coin-type battery armoring body made of steel which has a diameter of 20 mm and a height of 5 mm and was composed of a lid part and a bottom part, and upon the negative electrode, the separator, the positive electrode 10, there were disposed and contained a circular backing plate made of steel, and a plate spring, in this order. The non-aqueous electrolytic solution was supplied into the bottom part of the battery armoring body, the bottom part was covered with the lid part, and then the battery armoring body was caulked to be sealed to give a coin-type battery.

Example 2

A cylindrical battery and a coin-type battery for use in Example 2 were manufactured in the same manners as those for Example 1, except that melamine sulfate serving as the flame retardant agent was replaced by melamine polyphosphate.

Comparative Example 1

A cylindrical battery and a coin-type battery for use in Comparative Example 1 were manufactured in the same manners as those for Example 1, except for adding no melamine sulfate serving as the flame retardant agent.

Comparative Example 2

A cylindrical battery and a coin-type battery for use in Comparative Example 2 were manufactured in the same manners as those for Example 1, except that the melamine sulfate was replaced by trimethyl phosphate (TMP) represented by the chemical formula $(CH_3O)_3PO$ as the flame retardant agent and the non-aqueous electrolytic solution used was that in which the trimethyl phosphate had been dissolved at 10% by mass based on the total amount of the non-aqueous electrolytic solution. It is noted that all of the trimethyl phosphate used was dissolved in the non-aqueous electrolytic solution, and therefore solubility was indicated as an arbitrary amount.

[Differential Scanning Calorimetry]

Thermal analysis of the positive electrode active material 24 in a full charge state in the copresence of the non-aqueous electrolytic solution was performed by differential scanning calorimetry (DSC) for the purpose of comprehending the flame retardant effect of the flame retardant agents. The analytical procedures are as follows. Each of coin-type batteries of Example 1 and Comparative Examples 1 and 2 was charged at a constant current of 0.3 mA at 25° C. until the cell voltage became 4.3 V. Subsequently, each coin-type battery was disassembled, the positive electrode was taken out from the battery armoring body, washed with the non-aqueous solvent to remove the non-aqueous electrolytic solution, and then 1 mg of the positive electrode active material layer was scraped, and enclosed in a pressure-resistant airtight enclosure together with 1 μL of the non-aqueous electrolytic solution to be provided as a measurement sample. For each measurement sample, the temperature was raised from 25° C. to 550° C. at a temperature rising rate of 10° C./min using a DSC and the initial exothermic peak temperature and the calorific value were determined.

Table 1 shows the summarized heat generation peak temperatures and calorific values in Examples 1 and 2 and Comparative Examples 1 and 2.

able to raise the heat generation starting temperature in the exothermic reaction between the positive electrode active material 24 and the non-aqueous electrolytic solution, shift the heat generation peak to the higher temperature side even when the heat generation started, and make the calorific value smaller. In this way, the melamine-acid salt 30, when present within the positive electrode 10, exerts a flame retardant effect.

In addition, Examples 1 and 2 resulted in smaller calorific values even though the heat generation starting temperatures and the heat generation peak temperatures appeared at the lower temperature side, compared to those in Comparative Example 2. That is, the calorific value was reduced by arranging the melamine-acid salt 30 within the positive electrode 10. In this way, the melamine-acid salt 30, when present within the positive electrode 10, is more excellent in the flame retardant effect compared to trimethyl phosphate, which is soluble in the non-aqueous electrolytic solution.

[Evaluation of Initial Charge-Discharge Characteristics]

Then, the initial charge-discharge characteristics were evaluated for the purpose of comprehending the charge-discharge characteristics in the case of adding the flame retardant agent. The evaluation method is as follows. Each of the cylindrical batteries in Example 1 and Comparative Examples 1 and 2 was charged at a constant current of 250 mA at 25° C. until the cell voltage became 4.2 V, and charged at a constant voltage after the cell voltage reached 4.2 V. After the charge current value reached 50 mA, each battery was discharged at a constant current of 250 mA until

TABLE 1

| | Flame retardant agent | | | Starting | Peak | Calorific |
| | Name of compound | Adding quantity (% by mass) | Solubility (%) | temperature (° C.) | temperature (° C.) | value (J/g) |
|---|---|---|---|---|---|---|
| Example 1 | melamine sulfate | 1 | <0.1 | 287 | 308 | 1023 |
| Example 2 | melamine polyphosphate | 1 | <0.1 | 287 | 304 | 1010 |
| Comparative Example 1 | Not added | 0 | — | 284 | 298 | 1126 |
| Comparative Example 2 | Trimethyl phosphate | 10*[1] | Arbitrary amount | 303 | 310 | 1041 |

*[1]The added quantity in the non-aqueous electrolytic solution is indicated, since trimethyl phosphate is soluble therein.

Figure 2:
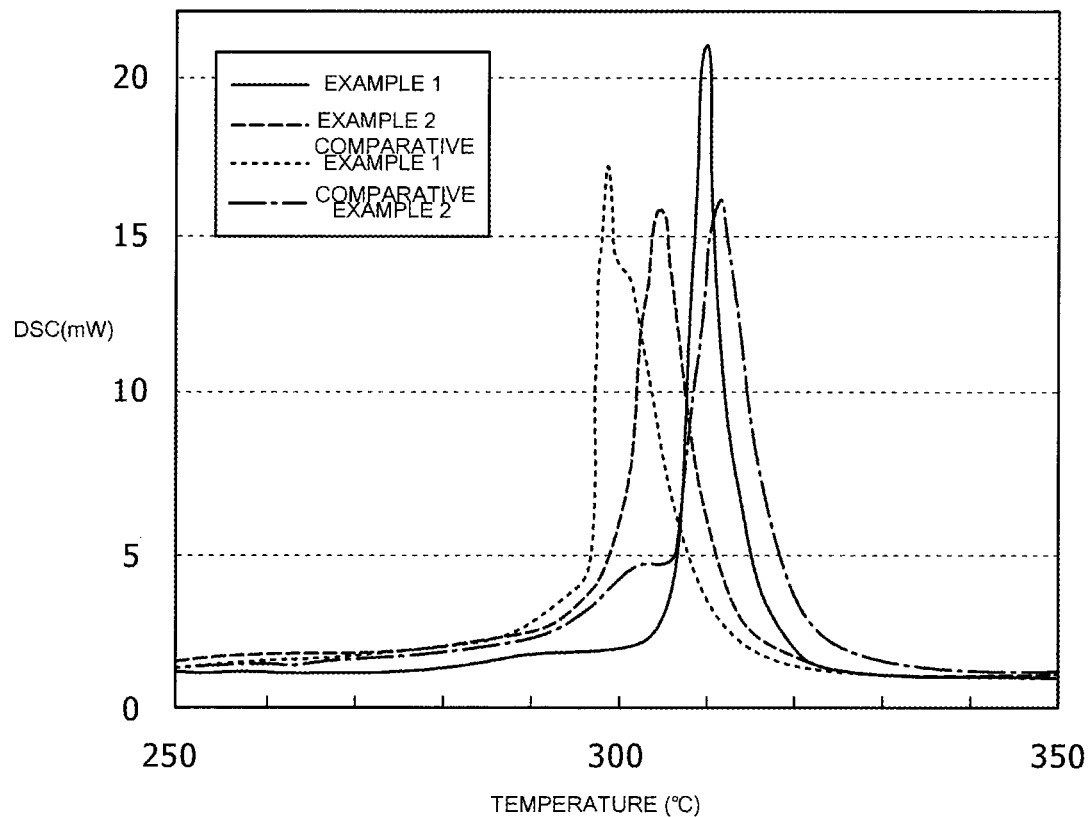
FIG. 2 is a drawing showing exothermic behavior in DSC for an Example and Comparative Examples.
Figure 3:
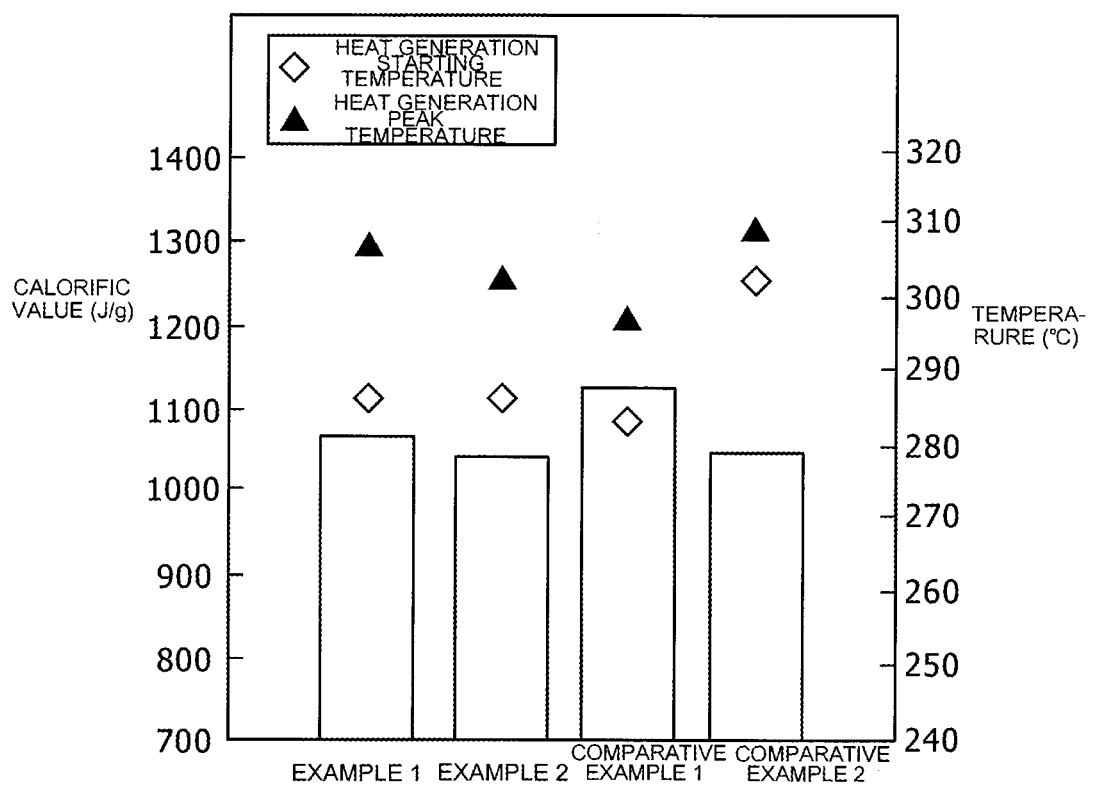
FIG. 3 is a drawing showing heat generation starting temperatures, peak temperatures, and calorific values in DSC measurement results for an Example and Comparative Examples.

FIG. 2 shows the exothermic behavior in DSC for an Examples 1 and 2 and Comparative Examples 1 and 2. FIG. 3 shows the summarized heat generation starting temperatures, heat generation peak temperatures, and calorific values based on the results of the DSC measurements.

As shown in FIG. 3, Examples 1 and 2 resulted in a higher heat generation starting temperature and heat generation peak temperature and a smaller calorific value compared to those in Comparative Example 1. That is, the melamine-acid salt 30, when present within the positive electrode 10, was the cell voltage became 2.5 V. The charge-discharge efficiency was determined by dividing the discharge capacity by the charge capacity and multiplying the resultant quotient by 100.

Figure 4:
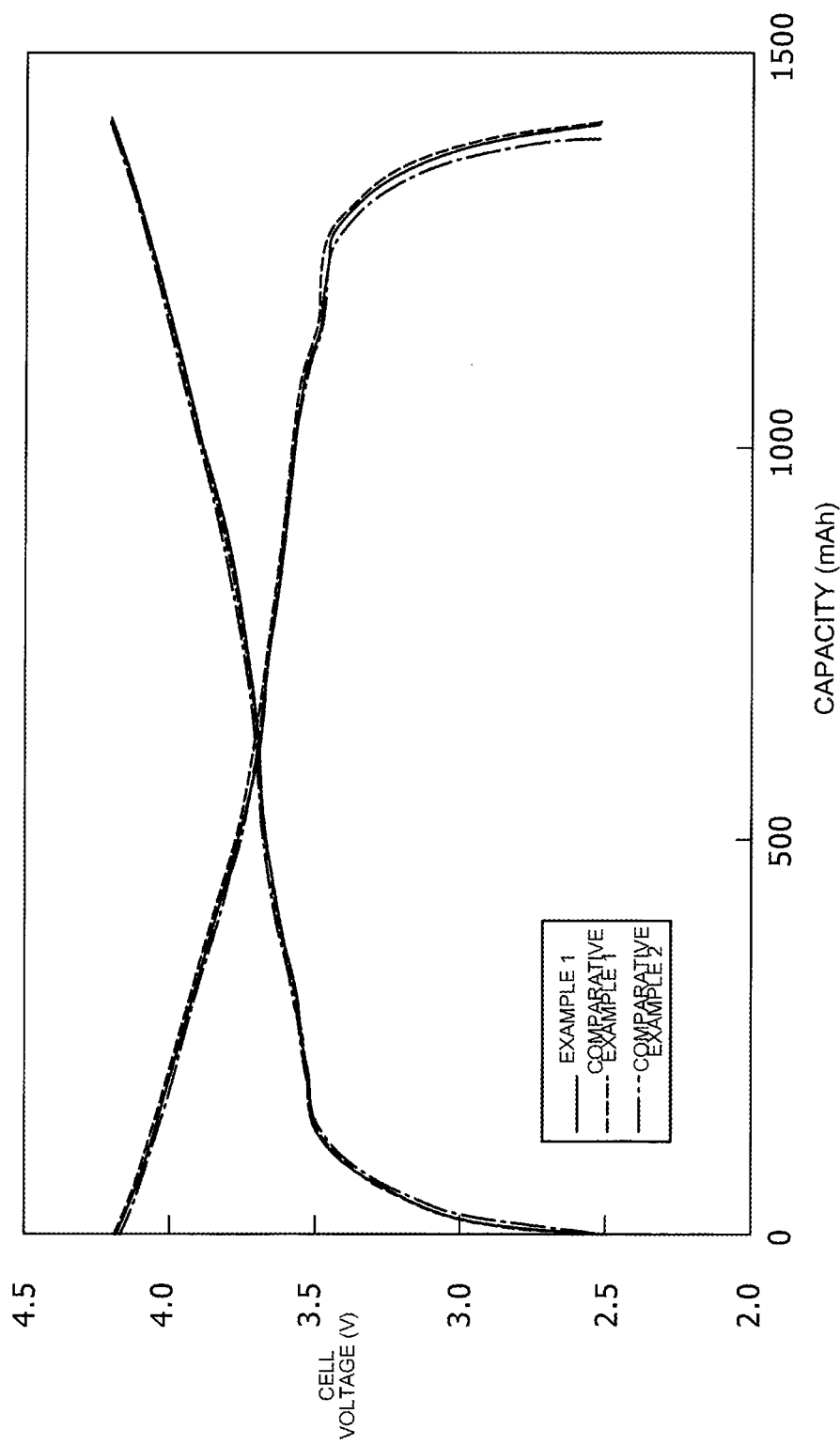
FIG. 4 is a drawing showing initial charge-discharge curves for an Example and Comparative Examples.

Table 2 summarizes the charge capacities, the discharge capacities, and the charge-discharge efficiencies in Example 1 and Comparative Examples 1 and 2. In addition, FIG. 4 shows the charge curves and the discharge curves in Example 1 and Comparative Examples 1 and 2.

TABLE 2

| | Flame retardant agent | | | Charge | Discharge | Charge-discharge |
| | Name of compound | Adding quantity (% by mass) | Solubility (%) | capacity (mAh) | capacity (mAh) | efficiency (%) |
|---|---|---|---|---|---|---|
| Example 1 | melamine sulfate | 1 | <0.1 | 1425 | 1407 | 98.7 |
| Comparative Example 1 | Not added | 0 | — | 1428 | 1412 | 98.9 |
| Comparative Example 2 | Trimethyl phosphate | 10*[1] | Arbitrary amount | 1431 | 1395 | 97.5 |

*[1]The added quantity in the non-aqueous electrolytic solution is indicated, since trimethyl phosphate is soluble therein.

As shown in Table 2 and FIG. 4, the charge capacity, the discharge capacity, and the charge-discharge efficiency obtained in Example 1 are almost the same as those obtained in Comparative Example 1. In this way, the melamine-acid salt 30, when present within the positive electrode 10 in a suitable adding quantity in the capacity design of the battery, gave input-output characteristics and charge-discharge efficiency comparable to those in the case without addition thereof. It is noted that the above-described input-output characteristics refer to the charge capacity and the discharge capacity.

In addition, in Example 1 more excellent charge-discharge efficiency was obtained compared to that in Comparative Example 2. That is, it is considered that when trimethyl phosphate, which is a flame retardant agent soluble in the non-aqueous electrolytic solution, is added in the non-aqueous electrolytic solution as in Comparative Example 2, the flame retardant agent is to be present throughout the inside of the battery, thereby reducing the ion conductivity of the non-aqueous electrolytic solution and deteriorating the input-output characteristics and the charge-discharge efficiency due to causing the side reaction with the negative electrode. On the other hand, it is speculated that the melamine sulfate used in Example 1 can remain within the positive electrode 10 as is because of being sparingly soluble in the non-aqueous electrolytic solution when added to the positive electrode active material layer 22, and therefore suppresses reduction of the ion conductivity of the non-aqueous electrolytic solution and the side reaction in the negative electrode while not causing reduction of charge-discharge efficiency, thereby being able to give excellent input-output characteristics and charge-discharge efficiency.

As described above, a flame retardant effect is exerted by using the melamine-acid salt 30. In addition, since the melamine-acid salt 30 is sparingly soluble in the non-aqueous electrolytic solution, the reduction of ion conductivity of the non-aqueous electrolytic solution and the side reaction with the negative electrode are suppressed. Further, since the melamine-acid salt 30 can exert the flame retardant effect by addition of a smaller amount compared to the flame retardant agent added within the positive electrode 10, which has been conventionally considered necessary to be added at 6% or more by mass, the positive electrode 10 containing the melamine-acid salt 30 is excellent in energy density.

In this way, the positive electrode for a non-aqueous electrolyte secondary battery comprising the melamine-acid salt 30 and the non-aqueous electrolyte secondary battery comprising the positive electrode for a non-aqueous electrolyte secondary battery are excellent in safety, input-output characteristics, and charge-discharge efficiency.

REFERENCE SIGNS LIST 10 positive electrode, 20 positive electrode current collector, 22 positive electrode active material layer, 24 positive electrode active material, 26 electrically conductive material, 28 binder, 30 melamine-acid salt.

The invention claimed is:

1. A positive electrode for use in a non-aqueous electrolyte secondary battery,
the positive electrode comprising a positive electrode current collector and a positive electrode active material layer formed on the positive electrode current collector,
the positive electrode active material layer having a positive electrode active material and a melamine-acid salt being a salt comprising melamine and acid,
wherein the melamine-acid salt is melamine polyphosphate having a solubility of 0.5% or less in a non-aqueous electrolytic solution serving as a liquid non-aqueous electrolyte, and represented by chemical formula (2):

[Formula 2]

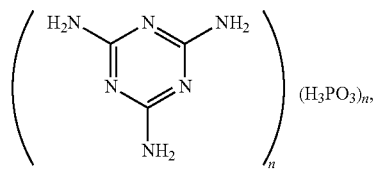

wherein content of the melamine-acid salt is 3% or less by mass based on the positive electrode active material layer,
and wherein a particle of the melamine polyphosphate is in contact with the positive electrode active material.

2. The positive electrode for a non-aqueous electrolyte secondary battery according to claim 1,
wherein the melamine-acid salt is contained at 1% or more by mass based on the positive electrode active material layer.

3. The positive electrode for a non-aqueous electrolyte secondary battery according to claim 1,
wherein the positive electrode active material layer comprises an electrically conductive material and a binder.

4. A non-aqueous electrolyte secondary battery comprising a positive electrode, a negative electrode, and a non-aqueous electrolyte,
the positive electrode comprising a positive electrode current collector and a positive electrode active material layer formed on the positive electrode current collector,
the positive electrode active material layer having a positive electrode active material and a melamine-acid salt being a salt comprising melamine and acid
wherein the melamine-acid salt is melamine polyphosphate having a solubility of 0.5% or less in a non-aqueous electrolytic solution serving as a liquid non-aqueous electrolyte, and represented by chemical formula (2):

[Formula 2]

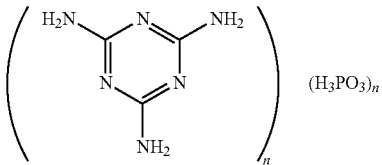

wherein content of the melamine-acid salt is 3% or less by mass based on the positive electrode active material layer
and wherein a particle of the melamine polyphosphate is in contact with the positive electrode active material.

5. The positive electrode for a non-aqueous electrolyte secondary battery according to claim 1, wherein a plurality of particles of the melamine polyphosphate are in contact with a surface of the positive electrode active material.

\* \* \* \* \*